United States Patent [19]
Yang et al.

[11] Patent Number: 6,088,333
[45] Date of Patent: Jul. 11, 2000

[54] MULTICAST ROUTING METHOD USING PATH OVERLAPPING EFFICIENCY IN VP-BASED ON ATM NETWORKS

[75] Inventors: Sunhee Yang; Bongtae Kim; Byungdo Go, all of Daejeon, Rep. of Korea

[73] Assignees: Electronics and Telecommunications Research Institute, Daejeon; Korea Telecom, Seoul, both of Rep. of Korea

[21] Appl. No.: 08/971,118

[22] Filed: Nov. 14, 1997

[30] Foreign Application Priority Data

Nov. 20, 1996 [KR] Rep. of Korea ............... 96-55702

[51] Int. Cl.[7] .............................. H04L 12/46; G06F 13/00
[52] U.S. Cl. .................... 370/238; 370/231; 370/255; 370/351; 709/238; 709/241
[58] Field of Search .................... 370/230, 231, 370/237, 238, 255, 256, 400, 408, 351; 709/238, 239, 241, 252

[56] References Cited

U.S. PATENT DOCUMENTS 5,684,961  11/1997  Cidon et al. ..................... 370/351

OTHER PUBLICATIONS

Zhu et al., "A Source–Based Algorithm for Delay Constrained Minimum–Cost Multicasting", IEEE, pp. 377–385, 1995.

Kompella et al., "Multicasting for Multimedia Applications", IEEE, pp. 2078–2085, 1992.

*Primary Examiner*—Chi H. Pham
*Assistant Examiner*—Frank Duong
*Attorney, Agent, or Firm*—Cohen, Pontani, Lieberman & Pavane

[57] ABSTRACT

Disclosed is a cost minimized multicast routing algorithm, that can be used for heterogeneous applications in ATM networks. In routing multipoint information flows over ATM VP/VC networks, the algorithm generates near optimal multicast tree based on the delay requirements of services, link costs and path overlapping effects for resource saving and quality-of-service satisfying purposes. This invention uses the virtual destination node in order to find the multicast route that maximizes the overlapping effects of the path between multiple destinations, thus minimizes the number of links and switches used in the multicast communications. Also, multicast tree branching occurs as near as possible to the destination nodes so that the overlapping effects of the multicast route can effectively reduce the network resource consumption.

6 Claims, 7 Drawing Sheets

MULTICAST ROUTING METHOD USING PATH OVERLAPPING EFFICIENCY IN VP-BASED ON ATM NETWORKS

BACKGROUND OF THE INVENTION

1. Field of the Invention

The present invention relates to a multicast routing method, for use in data communication networks such as Asynchronous Transfer Mode (ATM) network, which multicast tree branching occurs as near as possible to multiple destination nodes so that the overlapping effects of the multicast route can effectively reduce the network link consumption.

2. Description of the Prior Art

Asynchronous Transfer Mode (ATM) has emerged as a promising transfer technique of broadband networks for supporting multimedia, multicast communication services such as video teleconferencing and tele-education. To provide multimedia multicast communication services in ATM networks, many network functions have to be improved. Those include the signalling procedures, the connection management and switch architecture for cell copying and merging etc. The most important function required to provide multicast service may be the routing algorithm because it directly affects the network utilization and quality-of-service (QoS) provided to the applications. An efficient multicast routing scheme in ATM network has to be scalable and resource saving while guaranteeing various QoS requirements. Also, it must be simple especially for real time applications. Designing a multicast routing algorithm that satisfies all this requirements is quite challenging.

Most of conventional routing methods are minimizing the total bandwidth of tree-shaped route, and can be applied to the non-real time multicast applications of computer network. In general, a cost function is defined for each link of network reflecting the routing policy. Then the cost optimized tree-shaped route between a source node and destination nodes are computed. This problem is well known as minimum cost Steiner Trees that is NP-complete.

Thus, the conventional multicast routing method first simplifies the network as only constructed by source node and destination nodes, so that the computational complexity to find the multicast route is minimized. Thereafter, to find out the minimum cost tree-shaped route, the conventional methods added minimum cost link one by one until source node and all destination nodes are connected.

Even though, however, this network simplifying process used in conventional methods can alleviate the computational complexity required to find out minimum cost route, it suffers from a drawback that some information is lost about the intermediate branching nodes. The branching nodes are the intermediate nodes that can be branch for two or more destination nodes. The branching (cell copying) effect can maximize the path overlapping effect between multiple destinations, so that minimize the network bandwidth consumption in the delivery of multicast information. Accordingly, the conventional multicast routing methods suffers from a shortcoming that it is performed without the reflection of a path overlapping effect, the total bandwidth consumption is increased.

SUMMARY OF THE INVENTION

It is, therefore, a primary object of the invention to provide a multicast routing method which is capable of finding a bandwidth optimized multicast route connecting a source node and multiple destination nodes, and finding the minimum cost tree-shaped route based on the path overlapping effect and network simplifying, and can be used in an arbitrary communication networks such as ATM network.

In accordance with one aspect of the present invention, there is provided an apparatus, for use in a data communication network, for searching a least cost path connecting a source node and multiple destination nodes and allocating route to the nodes in the network, which comprises: a network manager processor for initializing configuration and status data of the network component and generating initialization data to control a multicast routing; a network model processor for creating a network model for the multicast routing, based on the configuration data, characteristics of a network resource and the status data passed by said network manager processor; a multicast routing processor, in response to a multicast routing request from an associated subscriber, for searching the cost optimized multicast route; a node processor, which disposed on each of the destination nodes, for receiving information for the source node, a group of the destination nodes, a type of service and routing constraint conditions, and delivering the multicast routing request through said network manager processor to said multicast routing processor; and a node interface control processor for interfacing between the nodes and the manager.

Preferably, the network manager processor includes: a network resource manager for managing information for the physical network configuration, a cost and a delay characteristics of the paths, and dispatching the same to the network model processor, to thereby allow the network model processor to be able to model the network; a network status manager for receiving the status data of nodes, and allowing a network model table to be updated according to a change in the status data; and a route manager for receiving the multicast routing request from the subscriber or the nodes, checking validation of the received multicast routing request, and delivering the checked data to its associated means to thereby allow it to perform their own functions.

Preferably, the network model processor includes: a physical network creation sector for creating a physical model table for recording therein the information for the nodes and the paths forming the physical network; a virtual network creation sector for configuring a virtual network model for use in the multicast routing through the use of a physical model table, to thereby make a virtual network model table; a virtual table update sector for updating the physical model table and the virtual network model table, when a status of the network is modified, or the multicast routing request from the subscriber is fed thereto; and a cost/delay computation sector for computing values of cost and delay for each virtual path, wherein the values of cost and delay may be automatically dived from the physical configuration data, or calculated through the application of a function defined by the subscriber.

Preferably, the multicast routing processor includes: a virtual destination node search sector for searching the virtual destination nodes by using information for the source node, the group of the destination nodes and the virtual network model table, estimating the destination nodes connected to each of the virtual destination nodes, and calculating path overlapping efficiency with respect to each of the destination nodes; a closure network formation sector for making a simplified network formed by using the least cost path and the configuration data from the virtual network model table, calculating the values of cost and delay, and recording the same on a closure network table; and a shortest route search sector for searching a shortest route connecting the source node and the group of destination nodes in the simplified network.

In accordance with another aspect of the present invention, there is provided a method, for use in a data communication network, for searching a least cost tree-shaped route connecting a source node and multiple destination nodes and allocating route in the network, which comprising the following steps: (a) downloading initialization data of a physical network configuration; (b) creating a physical model table based on the physical network configuration data; (c) creating a virtual network model table to be used in virtual path(VP)-based multicast routing; (d) applying a cost and a delay functions to VP links connecting each nodes; (e) waiting a multicast routing request from a subscriber; (f) receiving the source node, a group of the destination nodes, a type of service and routing constraint conditions, and checking their validation, based on the multicast routing request from the subscriber; (g) constructing a group of virtual destination nodes by using the virtual network model table, the source node, the group of the destination nodes, each of which acting as a branching node to two or more of destination nodes; (h) computing a path overlapping efficiency for the respective virtual destination nodes, wherein the path overlapping efficiency represents the number of the destination nodes which may be connected by the cell copy from the virtual destination nodes; (i) creating a closure network model in a full-mesh fashion by connecting the source node, the group of the destination nodes, and the group of the virtual destination nodes from each other, to thereby simplify the network; (j) creating a closure network table based on information for the closure network model; (k) computing the cost optimized tree-shaped route and adding minimum cost link one by one until all nodes are connected; (l) informing the resultant data obtained at the step (k) to each of the related nodes; and (m) reflecting the resultant data on the virtual network model table.

Preferably, a group of virtual destination nodes is obtained by the steps of searching the virtual destination nodes in response to the multicast routing request; searching multiple neighboring intermediate nodes connected to each of the destination nodes; detecting a neighboring node to be defined as one of cell copy branching nodes, connected concurrently to two or more of destination nodes among all of searched neighboring intermediate nodes; configuring multicast clusters for the destination nodes with respect to all the cell copy nodes; checking cost efficiency and delay constraints for each destination node; and storing the path overlapping efficiencies for the respective virtual destination nodes and information for the destination nodes contained in the multicast cluster.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1A:
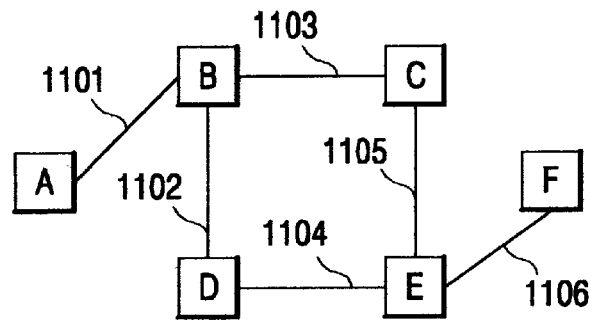
FIGS. 1A to 1C present configuration diagrams of a data communication network consisting of multiple nodes in ATM networks and the resultant multicast route applying the invented method, respectively.

This invention will be described in further detail by way of example with reference to the accompanying drawings. Like reference characters designate like or corresponding parts throughout the several views.

Figure 1B:
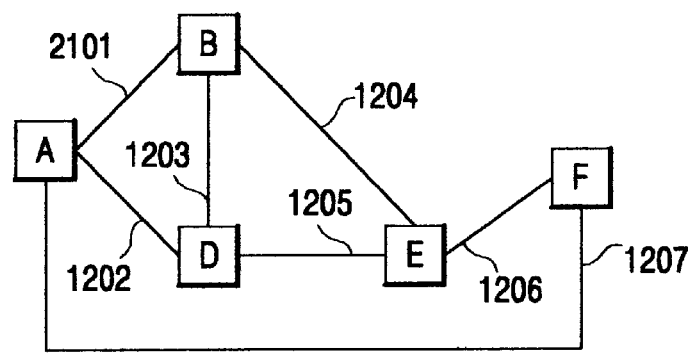
Figure 1C:
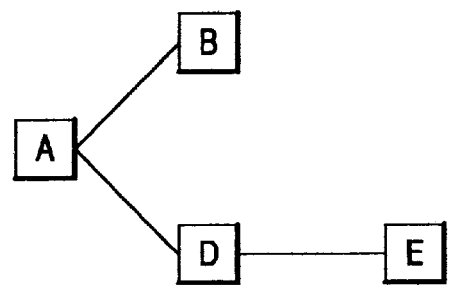

There are shown in FIGS. 1A to 1C configuration diagrams of an ATM network consisting of multiple nodes in accordance with the present invention.

FIG. 1A is presented an example physical ATM network, which consists of 6 Virtual Path(VP)/Virtual Channel(VC) switching nodes and 6 links connecting the nodes.

Referring to FIG. 1A, a source node is indicated by A, and a number of destination nodes are indicated by B, D, E, and F, respectively. A through node is indicated by C, which does not have a cell copy function and also does not have user access interface. Multiple links 1101, 1102, 1103, 1104, 1105 and 1106 connecting between the nodes A, B, C, D, E and F, represent physical link with a maximum allowable bandwidth and an unique delay characteristic, respectively.

Referring to FIG. 1B, there is shown a multicast network model which is reconstructed in virtual path level from the ATM physical network shown in FIG. 1A.

Each of the nodes A, B, D, E and F, is VP/VC switches, respectively, the respective links 1201, 1202, 1203, 1204, 1205, 1206 and 1207 are VP links and may be made of one or more physical links.

For example, the link 1207 connecting the source node A and the destination node F functions as the VP link, passing through four physical links, e.g., a sequence of the nodes A-B-D-E-F, or a sequence of the nodes A-D-B-E-F. As mentioned hereinabove, since the through node C has not the cell copy function and is no connected directly the subscriber, it have not represented in the multicast network model shown in FIG. 1B.

In FIG. 1B, a cost function Ce(A, B) and a delay function De(A, B) are defined for VP link 1201, and the cost function and delay function can be defined for each of the VP links 1202, 1203, 1204, 1205, 1206 and 1207. The cost function Ce(A, B) represents a cost for using link, which can be defined reflecting various cost causing factors, for example, a requiring bandwidth and the number of physical links passing through the VP link. The delay function De(A, B) denotes delay characteristics of the VP link, which may be defined by various delay causing factors, for example, a total length of the VP link, and a switching delay and a transmission delay suffering a unit traffic.

Referring to FIG. 1C, there is presented a resulting tree-shaped multicast routing model connecting the source node A and the destination nodes B, D, E, from the multicast network model shown in FIG. 1B. Such tree-shaped multicast routing model is utilized to represent directional point-to-multipoint information flows. The directional point-to-multipoint information flows can be well expressed as a tree-shaped model T(s, {M}), i.e., the source node A forms a root and the destination nodes B, D and E form leaves of tree, s being a source node and (M) being a group of the destination nodes. Accordingly, the multicast routing model shown in FIG. 1C is represented as T(A, {B, D, E}).

Figure 2:
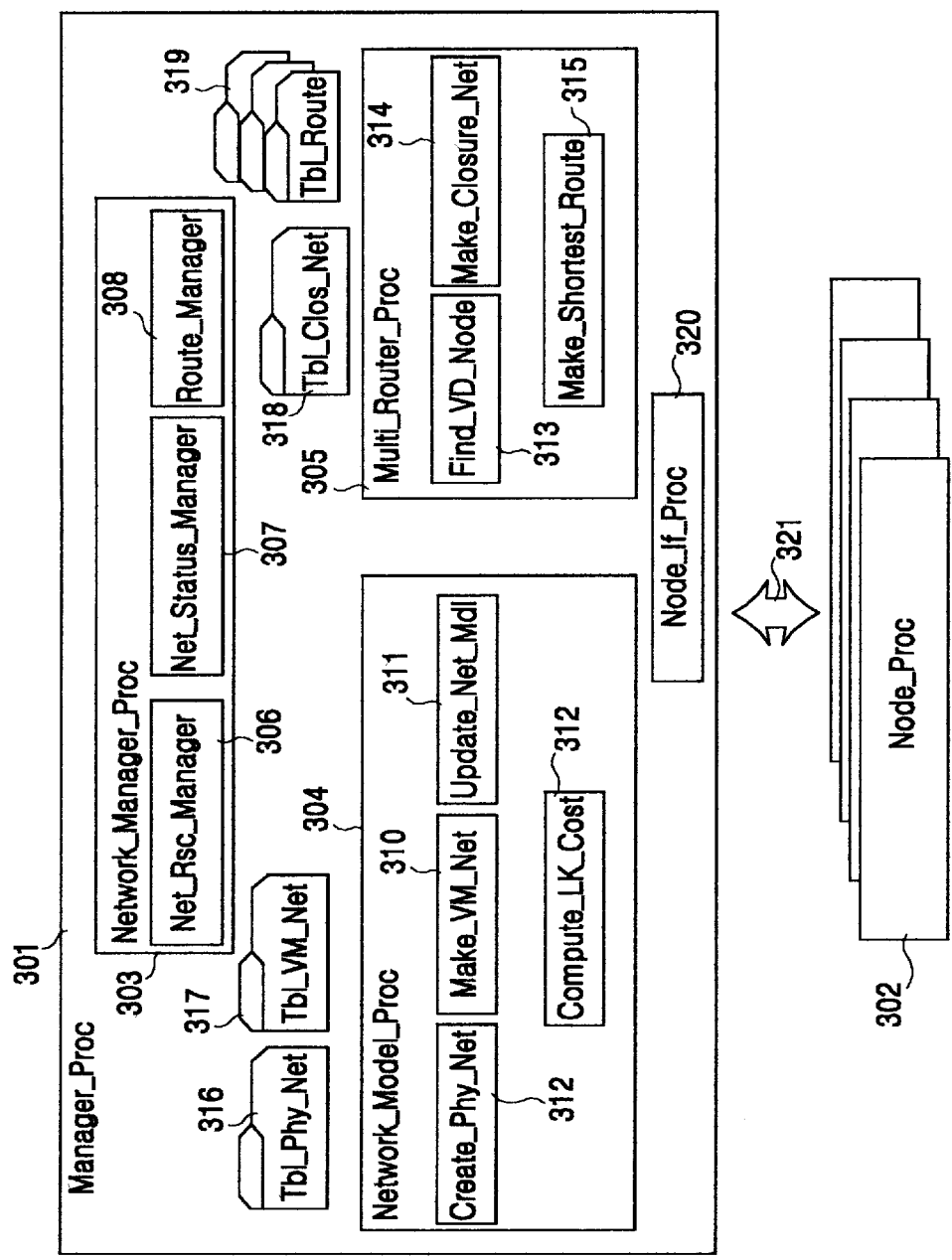
FIG. 2 offers a schematic block diagram illustrating a multicast routing apparatus of performing the multicast routing in accordance with a preferred embodiment of the present invention.

Referring to FIG. 2, therein is shown a schematic block diagram illustrating a multicast routing apparatus of performing the multicast routing in accordance with a preferred embodiment of the present invention.

The multicast routing system comprises a manager processor Manager_Proc 301 and a node processor Node_Proc 302. The Manager_Proc 301 serves to manage a network resource, a network modeling and a routing to implement the inventive multicast routing methods, which includes a network manager processor Net_Manager Proc 303, a Net_Model_Proc 304, a Multi_Router_Proc 305 and a number of tables, e.g., numbered by 316, 317, 318 and 319 as shown in FIG. 2.

The Net_Manager_Proc 303, which includes a network resource manager Net_Rsc_manager 306, a network status manager Net_Status_manager 307 and a route manager Route_Manager 308, is adapted to initialize configuration and status data of the network and manage the multicast route allocation.

The Net_Rsc_manager 306 serves to manage information for the physical network configuration, a cost and a delay characteristics of the links, and dispatch the same to the Net_Model_Proc 304, to thereby allow the Net_Model_Proc 304 to be able to model the network. The Net_Status_manager 307 receives the status data of nodes or links which is a primary element of the network configuration, and allows a network model table to be updated according to a change in the status data.

The Route_Manager 308 receives a multicast routing request from the subscriber or the nodes, checks validation of the received multicast routing request, and delivers the checked data to its associated processors to thereby allow it to perform their own functions. The Net_Model_Proc 304 serves to create a network model for the multicast routing, based on the network configuration data, the resource characteristic data, the status data of the network received from the Net_Manager_Proc 303, which includes a Phy_Create_Sector 309 for creating a physical network, a VM_Net_Create_Sector 310 for creating virtual network, a Net_Mdl_Update_Sector 311 for updating the virtual tables, and a LK_cost_Compute_Sector 312 for computing a cost of the links. The Phy_Create_Sector 309 in the Net_Model_Proc 304 serves to create a physical model table Tbl_Phy_Net 316 for recording therein the information for the nodes and the links forming a physical network. The VM_Net_Create_Sector 310 configure a VP-level virtual multicast network model using the Tbl_Phy_Net 316, to thereby make a virtual network model table Tbl_VM_Net 317. The LK_Cost_Compute_Sector 312 serves to compute values of cost and delay for each VP to be used in the multicast routing, wherein the values of cost and delay may be automatically dived from the physical configuration data, or calculated through the cost function defined by the network operator reflecting routing policy.

The Net_Mdl Update_Sector 311 serves to update the Tbl_Phy_Net 316 and the Tbl_VM_Net 317, when a status of the network is modified, or the multicast routing request from the subscriber is fed thereto. The Multi_Router_Proc 305, in response to the multicast routing request from the subscriber, plays the role of the computing multicast route, which includes a virtual destination node search sector VTN_Search_Sector 313, a closure network constructing sector Clos_Net_Form_Sector 314, and a shortest route search sector Short_Route_Search_sector 315.

The VTN_Search_Sector 313 serves to search virtual destination nodes by using information for the source node S, the group of the destination nodes M requested by the subscriber, and the Tbl_VM_Net 317 find the destination nodes which can be connected via each of the virtual destination nodes (branching nodes), and calculate path overlapping efficiency.

The Clos_Net_Form_Sector 314 is adapted to make a simplified fully connected network model including S, M and virtual destination nodes by using a minimum cost shortest path, based on the configuration data from the Tbl_VM_Net 317, and calculate the values of cost and delay in the virtual path connection connecting each of the nodes, and records the calculated values on the closure network table Tbl_Clos_Net 318.

The Short_Route_Search sector 315 serves to search a shortest tree-shaped route connecting the source node S and the group of destination nodes M in the simplified completely connected network made by the Clos_Net_Form_Sector 314. The node interface control processor Node_IF_Proc 320 serves to control the interface function between the Node_Proc 302 and the Manager_Proc 301.

Figure 3:
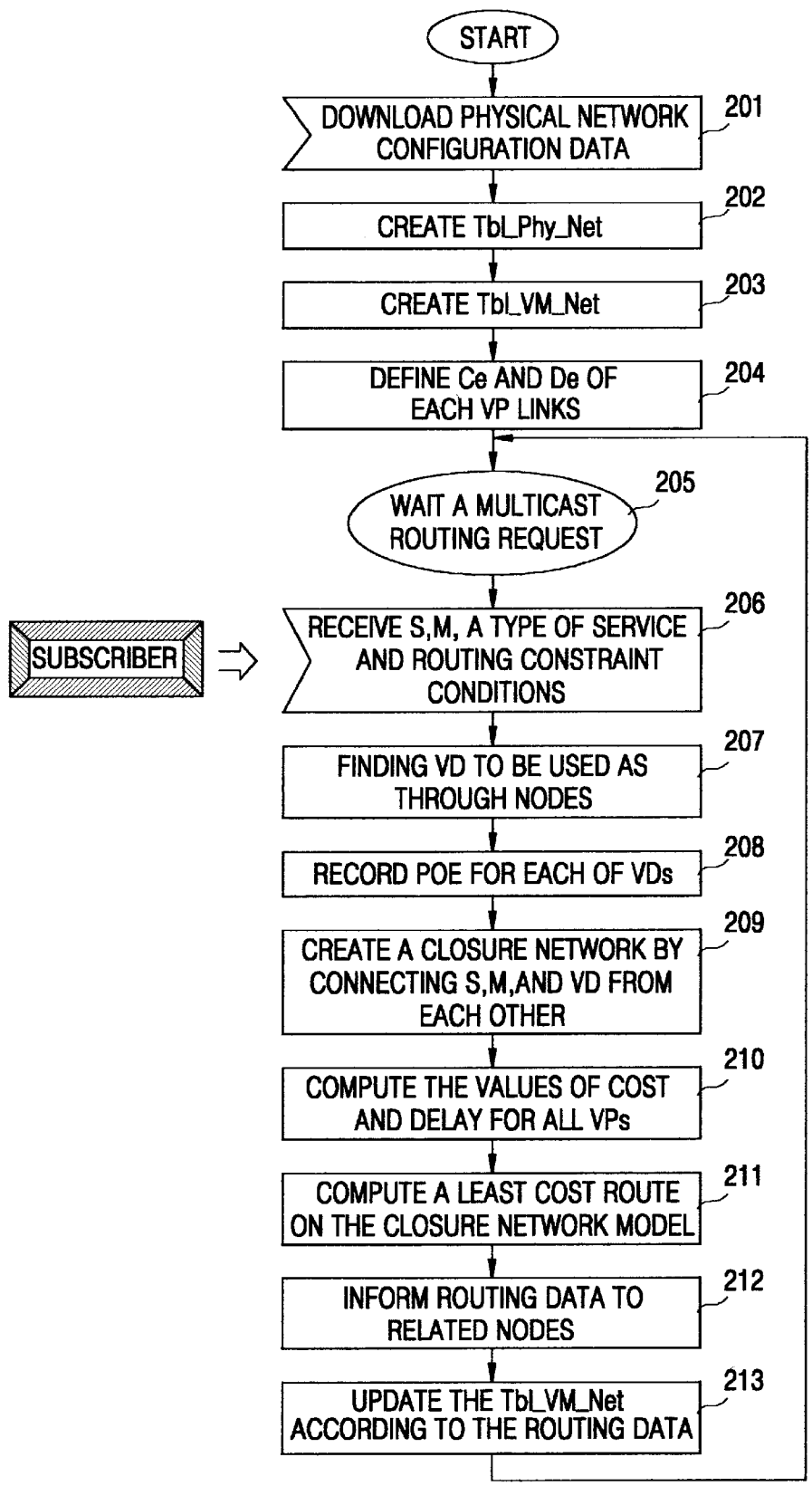
FIG. 3 exemplifies a flowchart of explaining the multicast routing method in accordance with a preferred embodiment of the present invention.

Referring to FIG. 3, there is shown a flowchart for explaining the multicast routing method in accordance with a preferred embodiment of the present invention.

In step S201, when the network is initialized, initialization data of physical network configuration is download from the Net_Rsc_manager 306 to the Net_Model_Proc 304, the physical network configuration data including, e.g., the number of nodes, the number of links connected to each nodes, maximum allocatable bandwidth, the cost and delay characteristics defined on each link, the existence of the cell copy function in each node, and information for whether the nodes are connected to the subscriber or not.

In step S202, the Phy_Create_Sector 309 in the Net_Model_Proc 304 creates the Tbl_Phy_Net 316 based on the physical network configuration data inputted thereto from the Net_Rsc_manager 306.

In step S203, the Tbl_VM_Net 317 based on the VP level, after being created the Tbl_Phy_Net 316, is created by the VM_Net_Create_Sector 310, wherein the multicast virtual network represents that multicast VPs are allocated on the physical network, to thereby allow the physical network to be regarded as a multicast-only virtual network.

It should be mentioned that the Tbl_VM_Net 317 may be configured under the control of a network operator, or automatically configured by a predetermined program, wherein in the present invention the Tbl_VM_Net 317 is configured by the automatical configuration process.

In step S204, after being configured the Tbl_VM_Net 317, the cost function Ce( ) and the delay function De( ) are applied to each VP links. Cost and delay data for the VP links are calculated by using the Tbl_Phy_Net 316 having the cost and delay information for the respective physical links. Thereafter, the initialization process is terminated if the multicast virtual network has been configured and the proceeding step is then followed by waiting a multicast routing request from the subscriber in step S205.

In step S206, when the multicast request is fed to the Node_Proc 302, the Node_Proc 302 disposed on the nodes receives the source node S, the group of destination nodes M, a type of service and routing constraint conditions, and checks the validity of user request. After the above step, routing process is performed if the multicast request is valid. The Node_Proc 302 delivers the multicast routing request through the Net_Manager_Proc 303 to the Multi_Router_Proc 305.

In step S207, the Multi_Router_Proc 305 constructs the group of virtual destination nodes VD through the use of information such as the Tbl_VM_Net 317, the source node S, the group of the destination node M and the like. Each of the group of virtual destination nodes VD is the branching node reachable to two or more of destination nodes. The use of this virtual destination nodes (VD) allows maximizing the path overlapping effect between multiple destination nodes, in comparison with the use of a independent path during data transmission in the communication network, so that the bandwidth consumption can be minimized.

In step S208, after being dived the group of virtual target nodes VD, a path overlapping efficiency(POE) for the respective virtual destination nodes is computed, wherein the path overlapping efficiency(POE) represents the number of the destination nodes(TNs) which can be connected by the cell copy from the virtual destination nodes.

In step S209, the closure network is created at the Clos_Net_Form_Sector 314 by connecting the source node S, the group of the destination node M, and the group of the virtual destination nodes VD from each other so as to simplify the network. The closure network represents that is connected completely in a full-mesh fashion with the aid of a path having a minimum cost between the source node S, the group of the destination node M, and the group of the virtual destination nodes VD. Specifically, the above step is a process of simplifying the network to reduce the computational complexity and to compute a least cost route connecting the source node and the destination nodes.

More specifically, in the above step, the process to find out shortest path between two modes, for example, A, B, is as follows. If the node C is selected as a closest node (which is a node yielding the minimum cost) before the source node A is coupled with the destination node B in the multicast virtual network model, then firstly a route connecting the source node A and the node C is chosen. Subsequently, the nodes A and C is regarded as one node and searching next closest node from them. For example, node D is the closest node from (A-C) or B, then D node is selected. That is, a series of the nodes A-C-D is searched for reaching to B node. The above process is repeated until the source node A and the destination node B is connected.

In step S210, after the Tbl_Clos_Net 318 is constructed from source node S, the group of the destination node M, and the group of the virtual destination nodes VD, the cost and delay values for all VP links are calculated and recorded to Tbl_Clos_Net.

Each VP level connection of the closure network model may be connected serially by one or more of VP links of the multicast virtual network. Accordingly, the values of cost and delay may be calculated as an accumulated value of each value dived from the respective VPs.

Since a path with a higher path overlapping efficiency is minimizing the bandwidth consumption, the cost of the VPs connecting source node S and the respective virtual destination nodes is divided by the path overlapping efficiency obtained at the above step S208. So that, the overlapped path is much cheaper than other candidate path, thus the path is preferentially selected in comparison with other links.

In step S211, after constructing the full-meshed closure network model, the least cost tree-shaped route is computed on the closure network model. Operations of the above step for driving the least cost route is similar to that of the step S209, but the step S211 should be repeated until all destination nodes is connected.

In this process of computing minimum cost route, when one of the virtual destination nodes has been contained, it may be regarded that all the destination nodes that can be reachable through this virtual destination node is connected.

In step S212, the resultant data obtained at the step S211 is notified all the related nodes of the network for allocating route. In step S213, the resultant data is then reflected on the Tbl_VM_Net 317. After that, the process returns to step S205 for waiting the multicast routing request from the subscriber.

Figure 4:
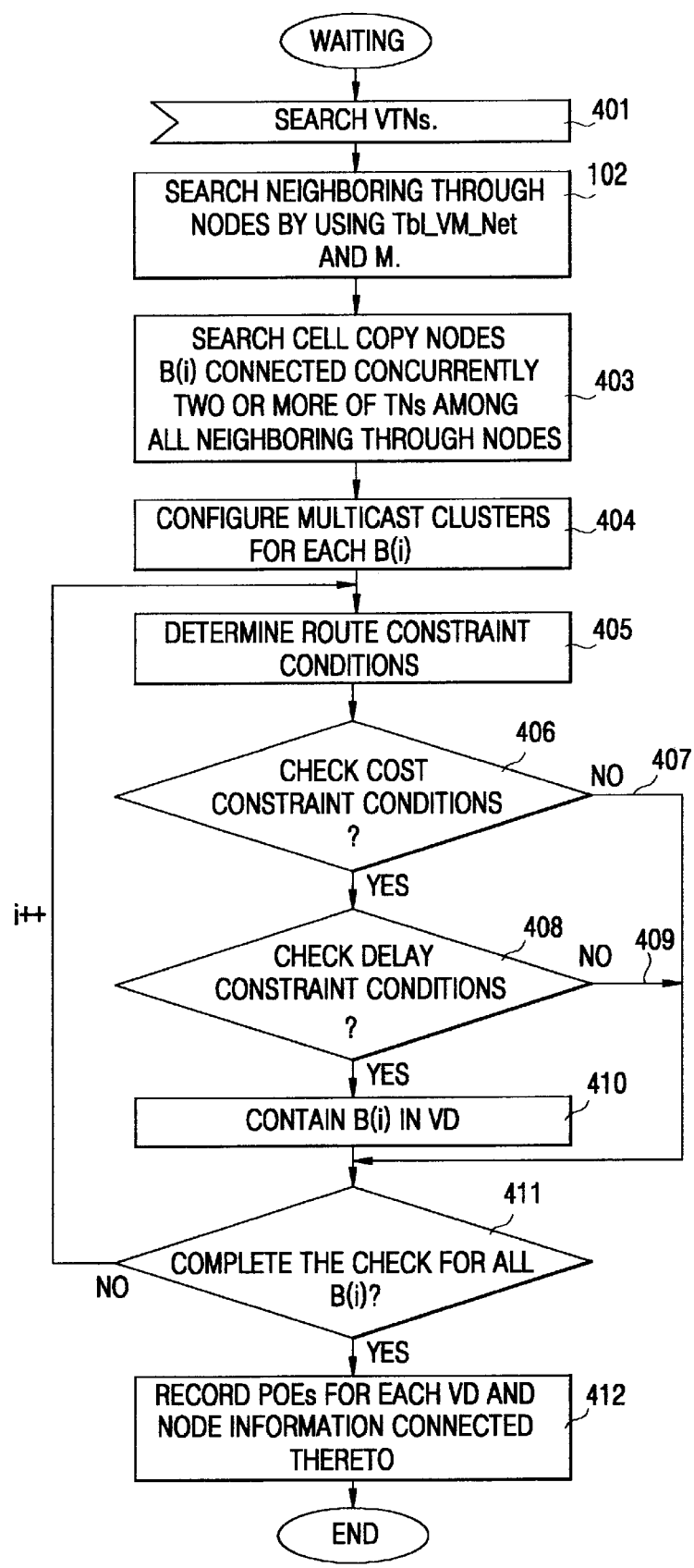
FIG. 4 designates a flowchart of explaining a process of searching the virtual destination nodes in accordance with the present invention.

Referring to FIG. 4, There is shown a flowchart of explaining a process of searching the virtual destination nodes in accordance with a preferred embodiment of the present invention.

In step S401, the Route_Manager 308, responsive to the multicast routing request from the subscriber, allows the VTN_Search_Sector 313 to search the virtual destination nodes(VTNs).

In step S402, neighboring through nodes connected to each of the destination nodes are then searched based on the Tbl_VM_Net 317 and the group of destination nodes M.

In step S403, from all of the searched neighboring through nodes, branching nodes B(i) connected concurrently two or more destination nodes are detected.

Figure 5:
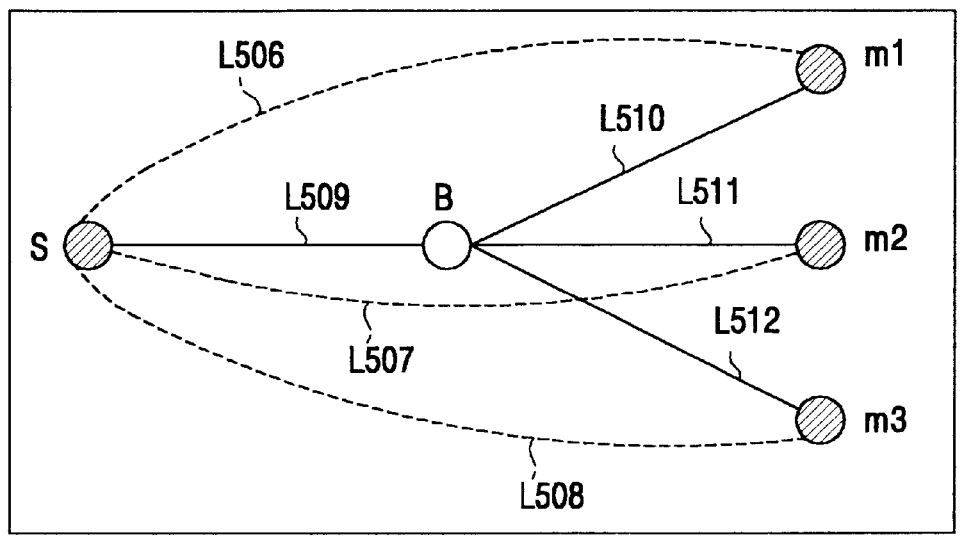
FIG. 5 exhibits an explanatory diagram of one of multicast clusters to check the requirement condition of the virtual destination node in accordance with the present invention.

In step S404, a number of multicast clusters for the detected branching nodes are configured. The multicast cluster as shown in FIG. 5 is used to check whether the branching node B(i) satisfies the cost and delay threshold. If it does the node becomes a member of the virtual destination node group.

In step S405, after being configured the multicast clusters, the threshold condition of virtual destination node are checked.

In step S406, the cost threshold condition is checked. If the total cost of the path connected through branching node B(i) is smaller than the total cost obtained for the case that they are individually connected, the B(i) can be candidate of virtual destination nodes. In this case, the process proceeds to step S408, wherein it is checked whether delay threshold conditions are satisfied or not. If not, the B(i) node can not be a member of virtual destination nodes, thus the step proceeds to step S407.

In the conditional branch step S408, it is checked whether delay threshold conditions are satisfied or not. That is, when the destination node branches through intermediate branching node, the delay of the path to each destination node should not exceed maximum allowable delay. If this delay constraints is satisfied, the process proceeds to step S410, wherein the branching node B(i) is a included in the virtual destination node group, if not so, the branching node B(i) is similarly excepted from the virtual destination node group.

In step S411, it is determined whether the check for the routing constraint conditions is completely performed with respect to all the multicast clusters or not. If not so, the process proceeds to the step S405 wherein the above step is repeated until all the branching node B(i) is checked.

In step S412, after being terminated the check for the group of the virtual destination node VD, path overlapping efficiencies for the respective virtual destination nodes and information for the destination nodes contained in corresponding multicast cluster are stored.

Referring to FIG. 5, there is shown an explanatory diagram of one of multicast clusters in accordance with the present invention, which includes a source node S, a cell copy node B and three destination nodes m1, m2 and m3, each of which can be connected through the cell copy node B.

In the multicast cluster shown in FIG. 5, the three destination nodes m1, m2 and m3 may be directly connected to the source node S through three paths numbered L506, L507 and L508 presented in FIG. 5, or may be connected through the cell copy node B. That is, in case the cell copy node B is employed therefor, the three destination nodes m1, m2 and m3 may be connected to the source node S through one common link L509 connecting the source node S and the cell copy node B, and three links L510, L511 and L512 connecting the cell copy node B and the destination nodes m1, m2 and m3, respectively.

A cost function Ce(a,b) and a delay function De(a,b) are applied with respect to each of the links L506, L507, L508, L509f L510, L511 and L512, wherein a and b in the parenthesis represent a start node and an end node(or, a destination node), respectively.

For example, in case of the common link L509, the cost function and the delay function are represented as Ce(S,B) and De(S,B), respectively, and the path overlapping efficiency corresponding thereto becomes 3.

Note that, in the cost constraint conditions, a total link cost for a sequence of the common link L509, the links L510, L511 and L512 connected through the cell copy node B should be smaller than that for the sum of link cost of L506, L507 and L508. In addition, note that, in the delay constraint conditions, the end-to-end delay in the respective destination nodes to be transmitted through the common link L509 should be less than a maximum allowable delay. For example, in case of the destination node m1, a delay to be induced on a sequence of the common link L509 and the link L510 should be less than the maximum allowable delay.

Similarly, the remaining destination nodes m2 and m3 should be also less than the maximum allowable delay, respectively. If the delay constraint conditions is satisfied with respect to each node, then the cell copy node B may be determined as the virtual destination node.

Referring to FIGS. 6A to 6E, there are shown diagrams illustrating the multicast routing method in accordance with a preferred embodiment of the present invention.

Figure 6A:
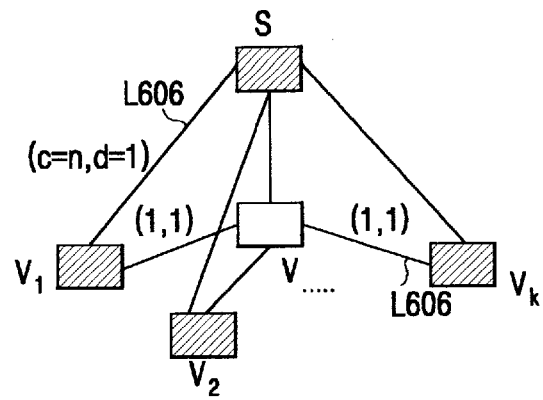
FIGS. 6A to 6E provide diagrams illustrating the inventive multicast routing method and the conventional method, respectively.
Figure 6B:
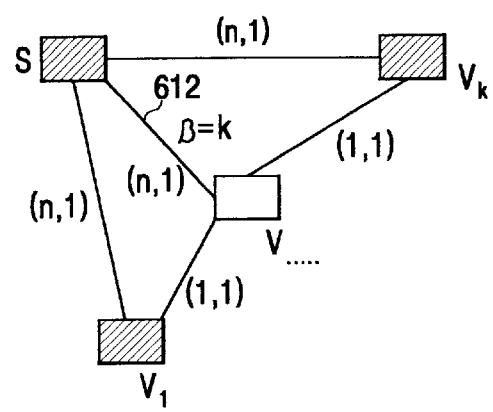

In FIG. 6A, during the multicast routing from the source node S to multiple destination nodes, e.g., V1, V2, . . . , Vk, it may be performed through an intervening node(i.e., the virtual destination node) V, or directly with respect to all destination nodes V1, V2, . . . , Vk without intervening the virtual destination node V, k representing the number of destination nodes with a positive integer.

In accordance with a preferred embodiment of the present invention, the virtual destination node V is first determined for the multicast routing. Values of cost and delay for each links connecting between the source node S and the virtual destination nodes V1, V2, . . . , Vk is set to be (n, 1), respectively. Since the number of the destination nodes connected to the virtual destination node V is k and the path overlapping efficiency of a common link L612 becomes k. Accordingly, a complete virtual network model may be obtained as shown in FIG. 6C.

Figure 6C:
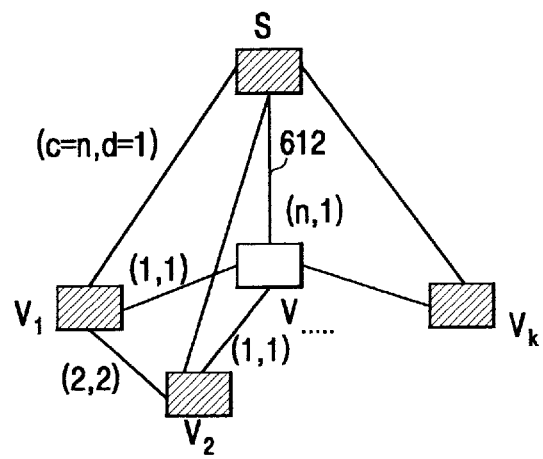

In the complete virtual network model shown in FIG. 6C, a common link L621 is determined as the least cost path, since the common link L621 has the path overlapping efficiency k to be set as n/k of cost.

Figure 6D:
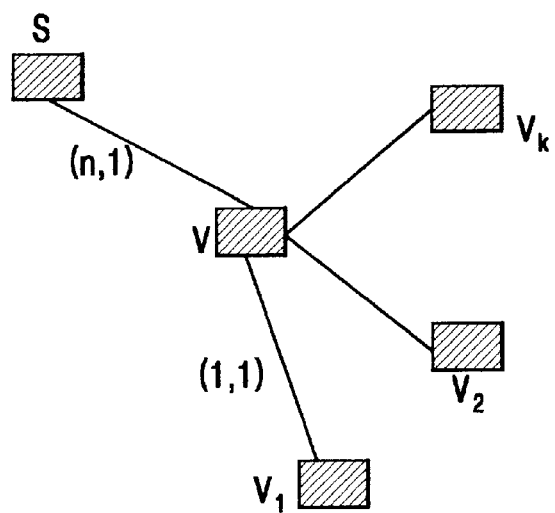

As shown in FIG. 6D, after being determined the virtual destination node V, each of the destination nodes is automatically connected to the virtual destination node V, to thereby be terminated the multicast routing of the present invention. In this case, the total cost is (n+k).

Figure 6E:
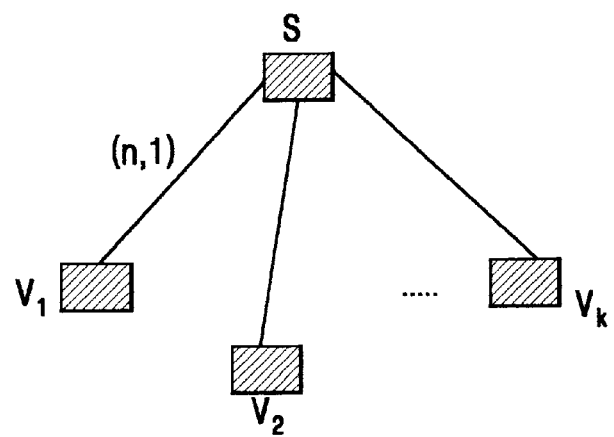

In the conventional multicast routing method previously described, however, if the least cost path is determined in the multicast virtual network shown in FIG. 6A, then each destination node Vk is directly connected to the source node S, to thereby be obtained a multicast routing as shown in FIG. 6E. In this case, the total cost is (n□).

Accordingly, by using the inventive multicast routing method, it will be apparent that the network resource efficiency can be improved by (n+k)/(n□).in comparison with the conventional method.

Furthermore, it should be readily appreciated that the multicast routing method of the present invention is capable of assigning a common link(or, an overlapping path) with respect to multiple destination nodes, especially in the case of a lager-scale data communication network with multiple destination nodes, to thereby further improve a link use efficiency.

Moreover, the multicast routing method of the present invention can be applied in private or public ATM networks.

While the present invention has been described with reference to the particular embodiments, it will be apparent to those skilled in the art that various changes and modifications may be made without departing from the spirit and scope of the invention as defined in the following claims.

What is claimed is:

1. An apparatus, for use in a data communication network, for searching a least cost multicast path connecting a source node and multiple destination nodes and allocating a route to the nodes in the network, which comprises:

a network manager processor for initializing a configuration and status data of the network and generating initialization data;

a network model processor for creating a network model for a multicast routing, based on the configuration, characteristics of a network resource and the status data passed by said network manager processor;

a multicast routing processor for searching the cost optimized multicast route in response to a multicast routing request from an associated subscriber;

a node processor disposed on each of the destination nodes for receiving information for the source node, a group of the destination nodes, a type of service and routing constraint conditions, and transmitting the multicast routing request through said network manager processor to said multicast routing processor; and a node interface control processor for interfacing between the destination nodes, the source node, and the network manager processor.

2. The apparatus according to claim 1, wherein said network manager processor includes:

a network resource manager for managing information for the physical network configuration, a cost and a delay characteristics of the paths, and dispatching the same to the network model processor, to thereby allow the network model processor to be able to model the network;

a network status manager for receiving the status data of nodes, and allowing a network model table to be updated according to a change in the status data; and a route manager for receiving the multicast routing request from the subscriber or the nodes, checking validation of the received multicast routing request, and delivering the checked data to its associated means to thereby allow it to perform their own functions.

3. The apparatus according to claim 1, wherein said network model processor includes:

a physical network creation sector for creating a physical model table for recording therein the information for the nodes and the paths forming the physical network;

a virtual network creation sector for configuring a virtual network model for use in the multicast routing through the use of a physical model table, to thereby make a virtual network model table;

a virtual table update sector for updating the physical model table and the virtual network model table, when a status of the network is modified, or the multicast routing request from the subscriber is fed thereto; and a cost/delay computation sector for computing values of cost and delay for each virtual path, wherein the values of cost and delay may be automatically dived from the physical configuration data, or calculated through the application of a function defined by the subscriber.

4. The apparatus according to claim 1, wherein said multicast routing processor includes:

a virtual destination node search sector for searching the virtual destination nodes by using information for the source node, the group of the destination nodes and the virtual network model table, estimating the destination nodes connected to each of the virtual destination nodes, and calculating path overlapping efficiency with respect to each of the destination nodes;

a closure network formation sector for making a simplified network formed by using the least cost path and the configuration data from the virtual network model table, calculating the values of cost and delay, and recording the same on a closure network table; and a shortest route search sector for searching a shortest route connecting the source node and the group of destination nodes in the simplified network.

5. A method, for use in a data communication network, for searching a least cost tree-shaped route connecting a source node and multiple destination nodes and allocating route in the network, which comprising the following steps:

(a) downloading initialization data of a physical network configuration;

(b) creating a physical model table based on the physical network configuration data;

(c) creating a virtual network model table to be used in virtual path(VP)-based multicast routing;

(d) applying a cost and a delay functions to VP links connecting each nodes;

(e) waiting a multicast routing request from a subscriber;

(f) receiving the source node, a group of the destination nodes, a type of service and routing constraint conditions, and checking their validation, based on the multicast routing request from the subscriber;

(g) constructing a group of virtual destination nodes by using the virtual network model table, the source node, the group of the destination nodes, each of which acting as a branching node to two or more of destination nodes;

(h) computing a path overlapping efficiency for the respective virtual destination nodes, wherein the path overlapping efficiency represents the number of the destination nodes which may be connected by the cell copy from the virtual destination nodes;

(i) creating a closure network model in a full-mesh fashion by connecting the source node, the group of the destination nodes, and the group of the virtual destination nodes from each other, to thereby simplify the network;

(j) creating a closure network table based on information for the closure network model;

(k) computing the cost optimized tree-shaped route and adding minimum cost link one by one until all nodes are connected;

(l) informing the resultant data obtained at the step (k) to each of the related nodes; and (m) reflecting the resultant data on the virtual network model table.

6. The method according to claim 5, wherein said step (g) includes:

(g1) searching the virtual destination nodes, responsive to the multicast routing request from the subscriber;

(g2) searching multiple neighboring through nodes connected to each of the destination nodes, based on the virtual network model table and the group of destination nodes;

(g3) detecting a branching node B(i) from all of searched neighboring through nodes, wherein the branching node is an intermediate node and is connected concurrently to two or more destination node;

(g4) configuring multicast clusters for the detected branching nodes, wherein the multicast cluster is constructed from source node, the branching node and the destination nodes, and is connected through the branching node and the shortest paths connecting them;

(g5) checking the cost threshold condition, wherein if the total cost of the path connected through the branching node is smaller than the total cost obtained for the case that they are individually connected, the branching node can be candidate of virtual destination nodes, if not, the branching node can not be a member of virtual destination nodes;

(g6) checking, if the cost threshold condition is satisfied in the step (g5), whether delay threshold conditions are satisfied or not, that is, when the destination node branches through intermediate branching node, the delay of the path to each destination node should not exceed maximum allowable delay;

(g7) allowing the cell copy node to be contained in the group of the virtual destination nodes, if the conditions is coincided with each other; and excepting the cell copy node from the virtual destination nodes, if not so;

(g8) repeating the above steps (g5) to (g7) until the check for all the multicast clusters is completed; and (g9) storing, after the step (g8), the path overlapping efficiencies for the respective virtual destination nodes and information for the destination nodes contained in the multicast cluster.

* * * * *